(12) United States Patent
Yoder et al.

(10) Patent No.: US 6,474,819 B2
(45) Date of Patent: Nov. 5, 2002

(54) COMBINATION OVERHEAD PROJECTOR AND ELECTRONIC DISPLAY DEVICE

(75) Inventors: Lars A. Yoder, Plano, TX (US); Frank J. Moizio, Dallas, TX (US); Michael T. Davis, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/813,531

(22) Filed: Mar. 21, 2001

(65) Prior Publication Data

US 2002/0021419 A1 Feb. 21, 2002

Related U.S. Application Data

(60) Provisional application No. 60/191,288, filed on Mar. 21, 2000.

(51) Int. Cl.[7] ............................................... G03B 21/28
(52) U.S. Cl. .............................. 353/98; 353/34; 353/35; 349/6
(58) Field of Search ............................. 353/98, 34, 35, 353/37, 28, 29, 63, 68, 122, 71; 349/5, 6, 7

(56) References Cited

U.S. PATENT DOCUMENTS

| | | | | |
|---|---|---|---|---|
| 5,159,363 A | * | 10/1992 | Brauning | 353/122 |
| 5,400,095 A | * | 3/1995 | Minich et al. | 353/119 |
| 5,477,284 A | * | 12/1995 | Taylor et al. | 353/122 |
| 5,593,221 A | * | 1/1997 | Evanicky et al. | 353/122 |
| 6,181,388 B1 | * | 1/2001 | Nomura | 349/5 |

FOREIGN PATENT DOCUMENTS

FR      2559923      *   8/1985   ........... G03B/21/12

* cited by examiner

*Primary Examiner*—Russell Adams
*Assistant Examiner*—Michelle Nguyen
(74) *Attorney, Agent, or Firm*—Charles A. Brill; Wade James Brady, III; Frederick J. Telecky, Jr.

(57) ABSTRACT

A projection display that combines both overhead projector and electronic display functionality in a single projector. This invention provides a single comprehensive solution, which addresses both overhead projection display needs, as well as electronic projection display needs and further provides a new function that allows superimposed images from the two functions to be captured and stored for future projection through the electronic display function.

38 Claims, 4 Drawing Sheets

COMBINATION OVERHEAD PROJECTOR AND ELECTRONIC DISPLAY DEVICE

This application claims priority under 35 USC §119(e)(1) of provisional application No. 60/191,288 filed Mar. 21, 2000.

FIELD OF THE INVENTION

The present invention relates to projection displays and particularly to combining an electronic and overhead display in a single unit.

BACKGROUND OF THE INVENTION

For many years overhead projectors have been popular as a means of projecting prepared transparencies or free-hand transparencies that are drawn in real-time, on to a display screen for viewing by a group (one or more) of viewers. More recently electronic displays, which are connected to various electronic data sources, have been used to project images normally seen on a computer screen on to a larger display screen for viewing by a group of viewers. Today, it is often necessary to equip conference or meeting rooms with both an overhead projector and an electronic display projector in order to accommodate uninterrupted presentations. This tends to be both expensive and somewhat awkward in switching between the projectors.

FIGS. 1a and 1b are diagrams showing a [top and] side view and a top view, respectively, for a typical overhead projector used in such applications. These projectors are typically packaged in two parts; e.g., a main projector housing 10 and a remote projection head 11. The main housing 10 consists of a bright, white light source 100 (lamp) along with its power supply (not shown), a rather large turning mirror 101, and a Fresnel lens 102 located just below a top glass media surface 103. The projection head 11 consists of a condensing lens 110, a smaller turning mirror 111, and a projection lens 112.

In operation, the operator (presenter) places a transparency on top of the glass media surface 103 just above the Fresnel lens 102. Light from the light source 100 is reflected and bent upward through the Fresnel lens 102, through the glass cover 103 supporting the transparency, and into the projection head 11. The light is modulated by a pattern on the transparency to provide an image with the dark areas of the transparency being black and the open areas of the transparency being white. In the projection head 11, the image is focused on to a smaller turning mirror 111 by means of a condensing lens 110. Light is then reflected off the turning mirror 111, through a projection lens 112, and on to an appropriate display screen 12, usually a white surface. The small turning mirror 111 can be tilted up and down to properly position the image on the screen and the projection lens 112 can be manually adjusted to properly focus the image on the screen. In the top view, the relative sizes of the projector's large turning mirror 101, the transparency 102, and the projection head's smaller turning mirror 111 are shown.

Electronic projectors have become quite popular in recent years due to their small size, lightweight, and high performance. These projectors are electronically driven with media content that is used to modulate the light and present either a color or black-and-white image on the display screen. The projectors come in different configurations, but usually use a spatial light modulator (SLM), such as a reflective digital micromirror device (DMD™) or liquid crystal device (LCD), to modulate the data. The projectors can be very small and lightweight, built around a single SLM and present a high-resolution, bright image with brilliant color representation. Electronic displays having two or three SLMs are also used for applications that require brighter projectors, such as for use in large conference halls.

FIG. 2 is block diagram for one configuration of a single-SLM electronic display projector. In this example, the projector is comprised of a white light source 200, which consists of a lamp and collector for gathering the light from the lamp and focusing it to a small spot at a point along the generated light beam. A rotating color filter wheel 201 is inserted at the focused spot of light in the light beam. A motor turns the wheel in synchronization with the electronic data being presented. The color wheel 201 is made up of red, green, and blue (primary colors) segments and transforms the clear light into sequential red, blue, and green light beams. In some cases, an optional white segment is added to the color wheel to help boost the overall brightness of the projector. In this configuration, light from the color wheel 201 is then passed through a light-integrating rod 202, through a condensing lens 203, and into a total internal reflective (TIR) prism 204. Inside this TIR prism, the light is reflected and directed on to the surface of a SLM 205 where it is modulated according to the electronic data content. Modulated light is then reflected off the surface of the SLM 205, back through the TIR prism 204, through a projection lens 206, and on to a display screen 207. Other optical configurations for such projectors do not necessarily utilize a TIR prism and/or integrating rod.

Together, these two projector types satisfy most presentation needs. However, what is needed is a flexible projection system that offers both of these projection capabilities in a single, reasonably priced package. The projector embodiments of the present invention meet this need by providing a single high-performance, comprehensive solution that addresses both the overhead projection display needs, as well as electronic display needs. The invention further provides a new function of capturing drawn transparencies from the overhead function and integrating (overlaying) these with the electronic content in terms of both an optical projected image and stored data.

SUMMARY OF THE INVENTION

The present invention discloses three embodiments of a combined overhead projector and electronic display projector system. The combined projector of this invention serves three major purposes. First, the overhead projector serves to display transparencies. Second, the electronic display device projects electronic data from several different types of electronic input sources, including NTSC and HDTV television, VGA (computer), S-video, etc. Third, both the overhead functionality and electronic display functionality can be used simultaneously to combine the data from both projectors. For example, while an electronic image is being displayed, the user can simultaneously draw in real-time a transparency so both images are superimposed on the display screen. In this mode, a camera mounted to the remote overhead projection head can be used to capture the drawn or superimposed image. Once captured by the camera, the new superimposed image can be electronically stored for future use.

Historically, overhead projectors and electronic projection displays have required the purchase of two completely separate products to address the two applications. In addition, before this invention it was difficult to simultaneously provide the functions of both the overhead projector display and the electronic projection display.

This invention provides a single comprehensive solution, which addresses both the overhead projection display needs as well as electronic projection display needs. The invention further provides a new function of integrating both drawn transparencies and electronic content in terms of both an optical projected display and electronic stored data.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

The present invention discloses three embodiments, the second embodiment having two configurations, of a combined overhead projector and electronic display projector system. This projector provides a single comprehensive solution, which addresses both the overhead projection display needs as well as electronic projection display needs and further provides a new function of integrating both drawn transparencies and electronic content in terms of both an optical projected display and electronic stored data.

Figure 1A:
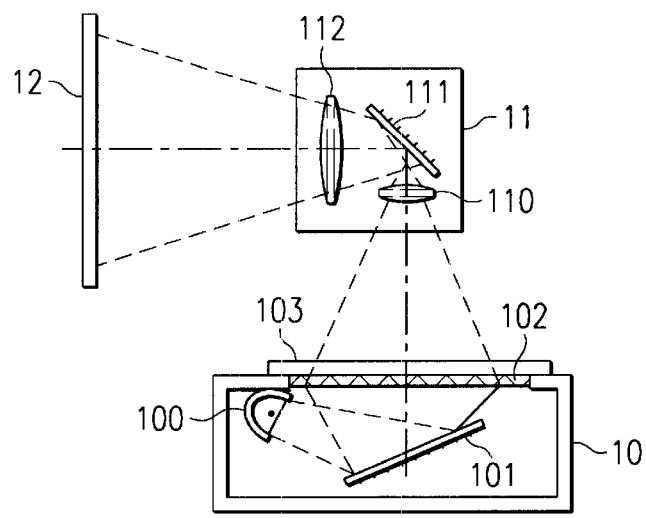
FIGS. 1a and 1b are diagrams showing a typical optical configuration of a prior art overhead projector.
Figure 1B:
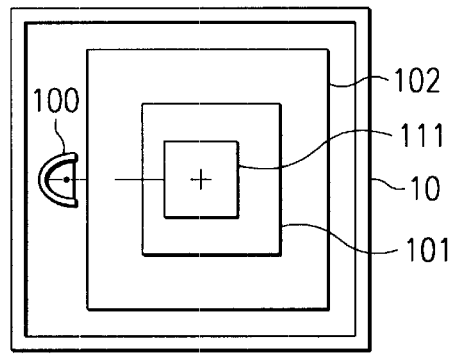
Figure 2:
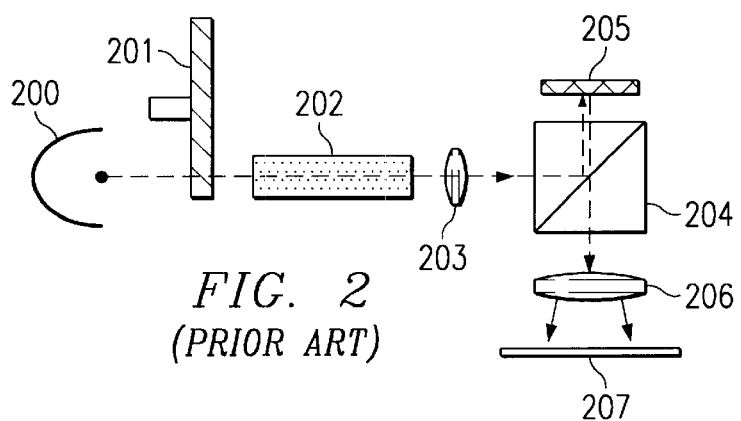
FIG. 2 is block diagram showing a typical optical configuration of a prior art single-SLM electronic display.
Figure 3A:
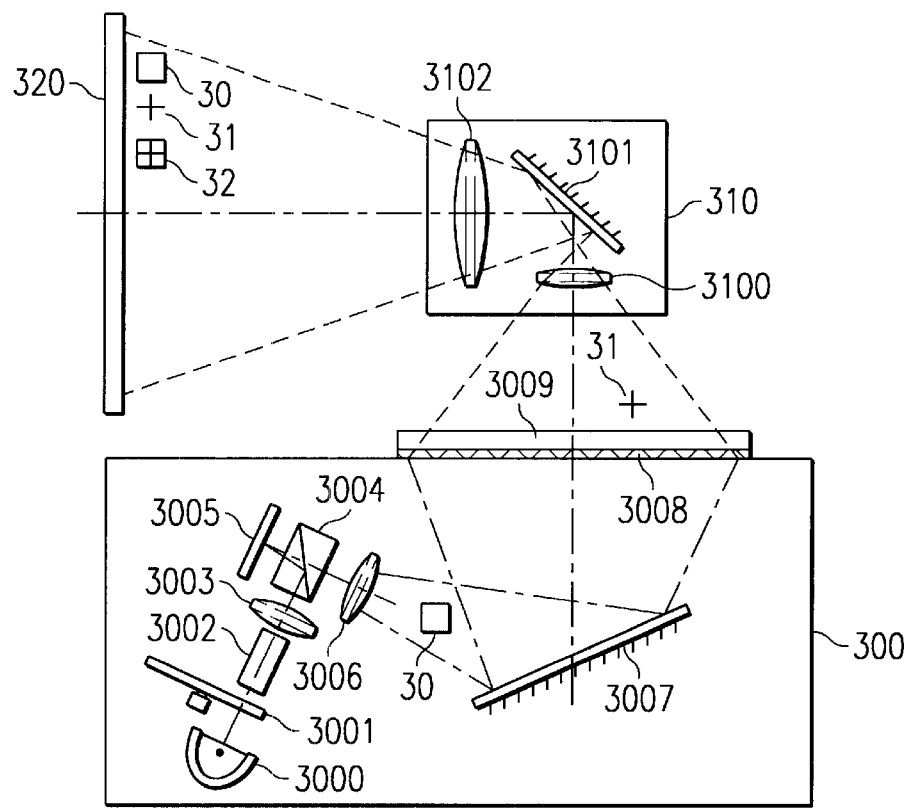
FIGS. 3a and 3b are diagrams showing the optical path for a first preferred embodiment of the combined overhead projector and electronic display of the present invention.
Figure 3B:
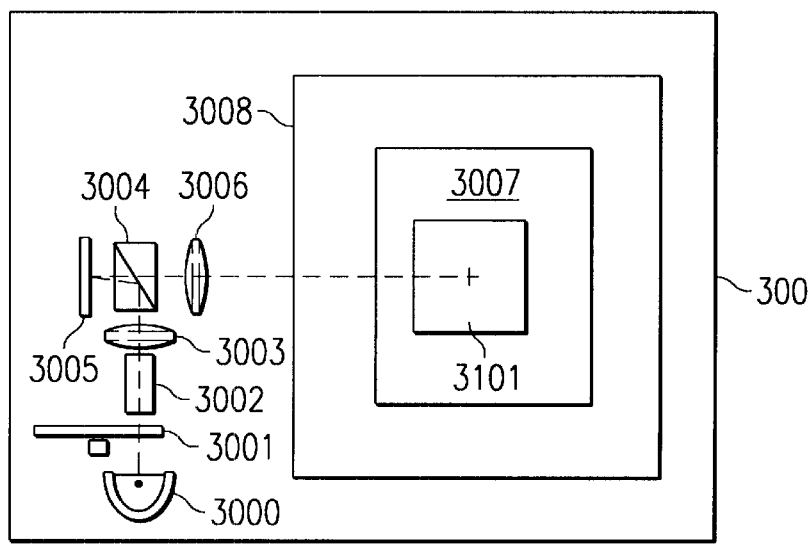

FIG. 3 is a diagram showing both side and top views of the optical path for the first preferred embodiment of the combined overhead projector and electronic display of the present invention. This elegant solution uses the same optics for both the overhead and electronic display functions with the difference being that a reflective spatial light modulator (SLM) is used to modulate the light for electronic display projection, while the SLM is completely turned ON to reflect all the light for overhead projection with the light being modulated by means of a transparency. As a result, the projector is small and compact.

The projector has a main optics housing 300, a projection head 310, and a display screen 320. The optical path, which is identical for both projectors, starts with a light source 3000, which consists of a lamp and reflector. White light from this source is focused to a small spot at the entrance to a rotating color filter wheel 3001, that has red, green, and blue filter segments and is driven by a motor that is synchronized with the electronic media. The sequential red, green, and blue (primary colors) beam of light from the color wheel is then passed through an integrator rod 3002, through a condensing lens 3003, and into a total internal reflective (TIR) prism 3004. An optional clear segment can also be added to the color wheel to boost the overall brightness of the projector. The light beam is then reflected internal to the TIR prism 3004 on to the surface of a SLM 3005. Light from the reflective SLM 3005 is then reflected back through the TIR prism 3004, through a first projection lens 3006, off a first turning mirror 3007, and up through a Fresnel lens 3008 and clear glass plate 3009 at the media surface of the projector where the transparency is loaded into overhead projector, and into the remote projection head optics 310. It should be noted that this embodiment can be implemented using other standard display optics configuration, which may not include a TIR prism and/or an integrating rod.

The remote projection head 310 consists of a second condensing lens 3100, a second smaller turning mirror 3101, and a second projection lens 3102.

When the combined projector is being operated solely as an overhead projector, all the pixels of the SLM 3005 are turned ON to reflect all the available light from the light source 3000 into the backend of the projection optics, through the media transparency located on top of the Fresnel lens 3008, and through the projection head to produce an overhead image +31 on a display screen 320. In this case, if only black and white transparencies are being used, the rotating color wheel can be removed from the optical path by means of a separate mechanism (not shown) to increase the brightness of the projected image.

In the case where the combined projector is being operated solely as an electronic display, the pixels of the SLM 3005 are modulated based on the electronic content of the medial data, so that an 8-bit or greater color electronic image ☐30 is projected through the backend projection optics on to the display screen 320. Here there is no transparency at the Fresnel lens 3008, so that only the electronic display image is seen on the screen 320.

To superimpose and simultaneously project both overhead type images and electronic display type images through the projector, a transparency is simply placed on the glass plate media surface 3009 just above the Fresnel lens 3008 position. A superimposed image ⊞32 is then presented on the display screen 320, which represents the combination of the overhead and electronic display projector images. The transparency can be hand drawn in real-time, in black-and-white or color, which is a unique capability of the present invention. Alternately, the transparency can be prepared in advance.

Figure 4:
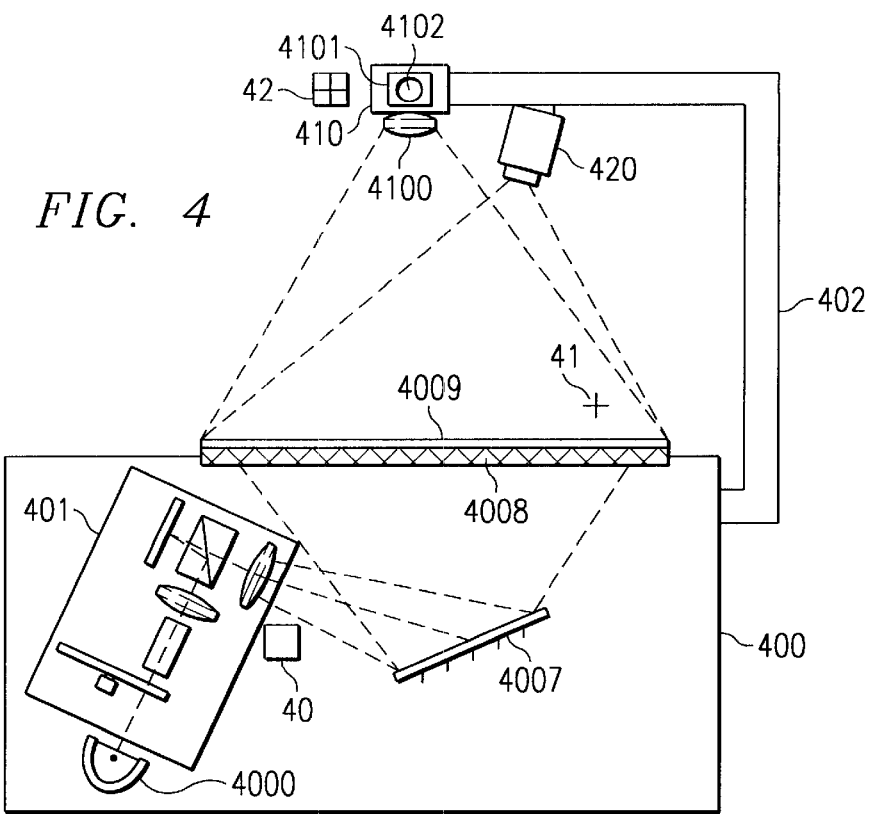
FIG. 4 is a block diagram showing a packaging configuration, including a camera for capturing and storing a superimposed image, for the first embodiment of the combined overhead projector and electronic display of the present invention.

FIG. 4 is a block diagram showing a packaging configuration, including a camera for capturing and storing a superimposed image, for the first embodiment of the combined overhead projector and electronic display of the present invention discussed above. The projector is comprised of a main chassis 400 with a glass media surface 4009 on the topside for placing transparencies and a remote projection head 410 connected to the main chassis 400 my means of a retractable (fold-up/down) arm 402. The main chassis 400 houses the light source 4000, the electronic display optics 401, a large turning mirror 4007, a Fresnel lens 4008 located just below the glass media surface 4009, and a lamp power supply (not shown). The remote projection head 410 contains a condensing lens 4100, a smaller turning mirror 4101, and a projection lens 4102. A camera 420 is attached adjacent to the remote projection head 410 on the arm 402, and can rotate to capture a drawn or superimposed image from either the media surface 4009 or from the display screen (not shown). As discussed above, in operation the projector can be used solely as a overhead projector to project on to the screen the image or drawing (+41) of a transparency, solely as an electronic display to project electronic content (□40) on to the screen, or to superimpose and simultaneously project the two combined images (⊞42) on to the screen. The camera 420 is used to capture the combined image and store it for future use.

Figure 5:
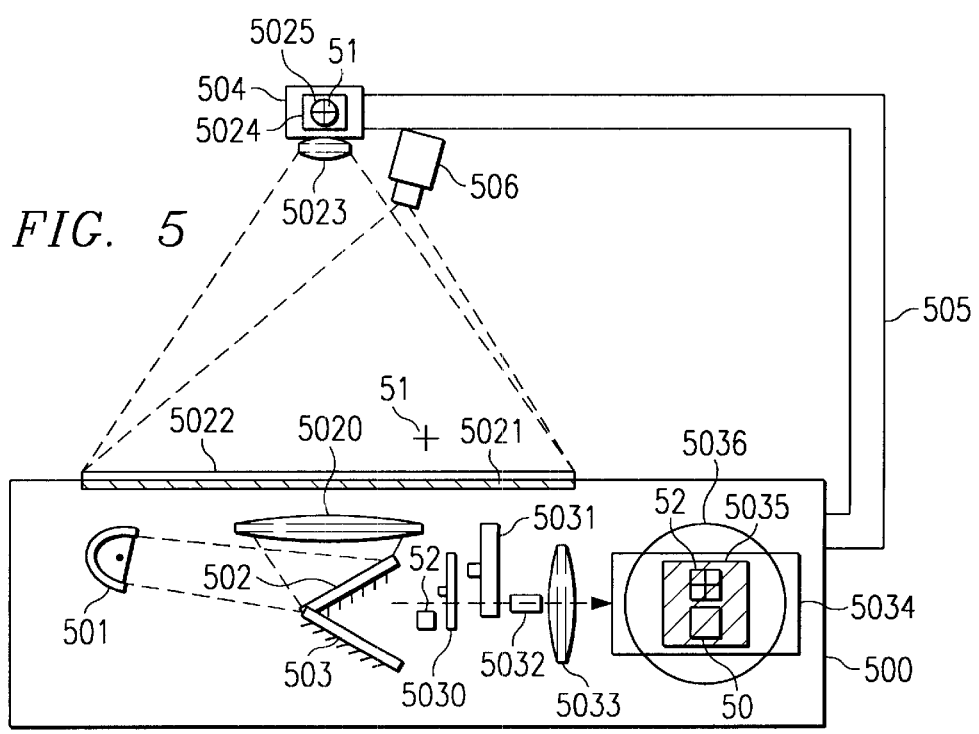
FIG. 5 is a diagram showing a first configuration for the second embodiment of the combined overhead projector and electronic display of the present invention, where a light source is directly coupled either into the electronic display optics or into the overhead projector optics by means of a switchable mirror. A camera for capturing, superimposing, and storing a drawn overhead transparency image is also shown.

FIG. 5 is a diagram showing a first configuration for the second embodiment of the combined overhead projector and electronic display of the present invention, where white light from a light source 501 is switched by means of a switchable mirror, which flips between a first position 502 and a second position 503, to couple light along a first path directly into the overhead projection optics 5020–5025 or along a second path directly into the electronic display optics 5030–5036, respectively. In this configuration, the electronic display optics 5030–5036 are located in the main chassis 500, while part of the overhead optics 5020–5022 are located in the main chassis 500 and the remaining optics 5023–5025 are located in the remote projection head 504. The remote head 504 is attached to the main chassis by means of an extractable arm 505. In operation, when the switchable mirror is in position 502, this mirror is used as the first turning mirror for the light coming from the light source 501. Light reflected from this mirror 502 passes through a first projection lens 5020, through a Fresnel lens 5021 and clear glass media surface 5022, up to the remote head 504 where it passes through a condensing lens 5023, off a second turning mirror 5024, and through a second projection lens 5025, on to a display screen (not shown).

When the switchable mirror is in position 503, it is out of the way, allowing light from the light source 501 to couple directly into the electronic display optics, where it passes through a first condensing lens 5030, through a rotating color filter wheel 5031, through a light integrating rod 5032, through a second condensing lens 5033, into a TIR prism 5034 where it is reflected on to the reflective surface of a SLM 5035, back through the TIR prism 5034, and through a projection lens 5036 on to the same display screen (not shown). A camera 506 is added for capturing a drawn image from the transparency and then adding it electronically to the electronic display image in order to project a superimposed image and store it for future use. Optionally, the captured drawn image can be displayed from the camera.

As in the first embodiment, the combined projector of the second embodiment can be used to solely display overhead projector data (+51) or only electronic display data (□50). In this embodiment, stored superimposed data ⊞52) is projected through the electronic display.

Figure 6:
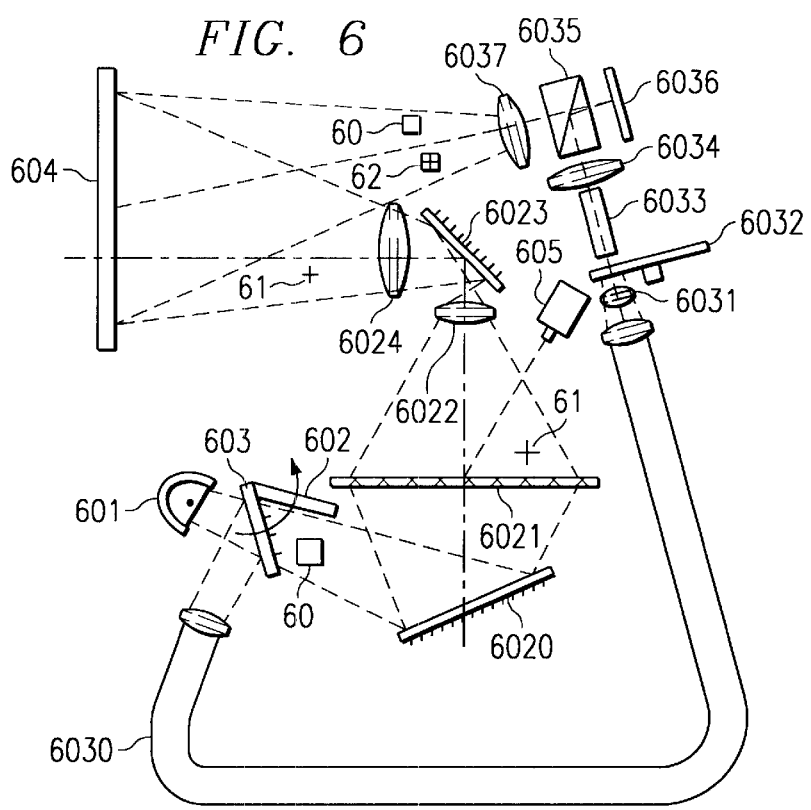
FIG. 6 is a diagram showing a second configuration for the second embodiment of the combined overhead projector and electronic display of the present invention, where the light source is directly coupled either into the overhead projector optics or into the electronic display optics, by means of a flexibly light guide, such as a fiber optic bundle or plastic rod. A camera for capturing, superimposing, displaying, and storing a drawn overhead transparency image is also shown.

FIG. 6 is a diagram showing a second configuration for the second embodiment of the combined overhead projector and electronic display of the present invention, where the light source is switched by means of a switchable mirror either directly into the overhead projector optics or into a fixed fiber optics bundle coupled to the electronic display optics. In this case, when the switchable mirror is in position 602 it is out of the way allowing light from the light source 601 to directly enter and pass through the overhead projector optics 6020–6024, where the light is modulated by means of a transparency and projected on to a display screen. The overhead projection optics consists of a first turning mirror 6020, a Fresnel lens 6021, a condensing lens 6022, a second smaller turning mirror 6023, and a projection lens 6024. On the other hand, when the switchable mirror is in position 603, light from the light source 601 is reflected into a flexible fiber optic cable 6030, which couples the light to the electronic display optics 6031–6037. The electronic display optics as shown consists of a first condensing lens 6031, a rotating color filter wheel 6032, a light integrating rod 6033, a second condensing lens 6034, a TIR prism 6035, a SLM 6036, and a projection lens 6037. A camera 605 is added for capturing a drawn image from the transparency and then adding it electronically to the electronic display image in order to project a superimposed image and store it for future use. Again, optionally, the captured drawn image can be displayed from the camera.

The combined projector can be used to solely display overhead projector data (+61) or only electronic display data (□60). In this embodiment, stored superimposed data (⊞62) is projected through the electronic display. This configuration of the invention, through the use of the flexible fiber optics cable 6030 allows for the electronic display optics to be packaged in different locations (shown in remote head) for improved performance, size, weight, and cost considerations.

Figure 7:
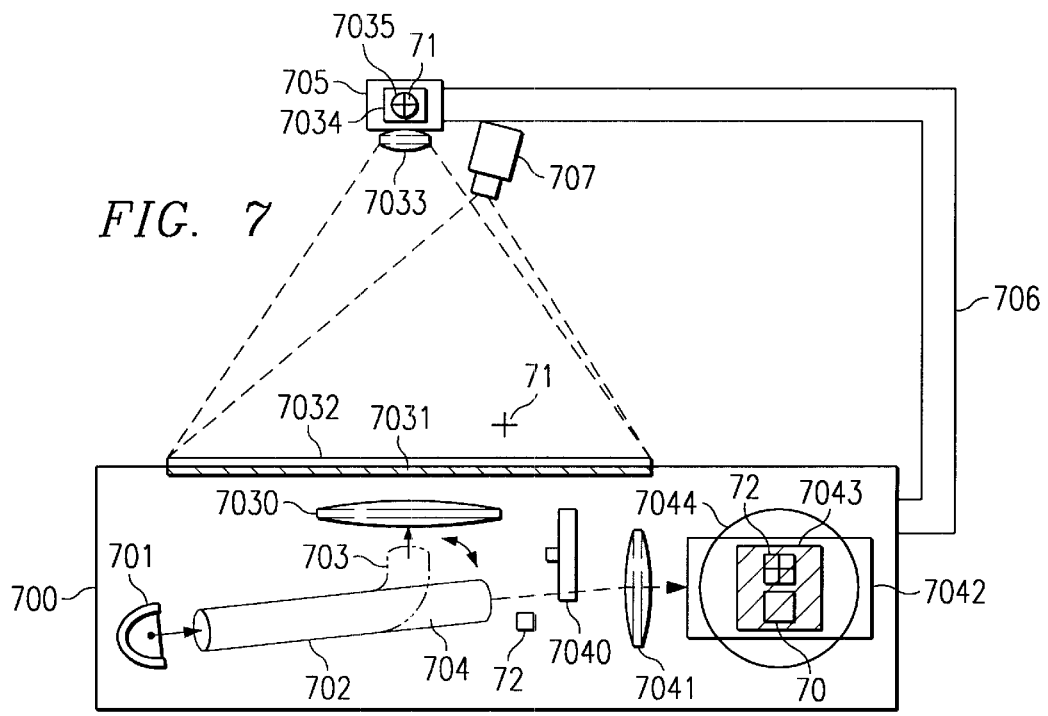
FIG. 7 is a diagram showing a third embodiment of the invention, where the light source is switched between the overhead projector and electronic display by means of a flexible (switchable) light guide or fiber optic bundle. A camera for capturing, superimposing, displaying, and storing a drawn overhead transparency image is also shown.

FIG. 7 is a diagram showing a third embodiment of the combined overhead projector and electronic display of the present invention, where the switchable mirror of the second embodiment is replaced with a flexible (switchable) light guide or fiber bundle 702 that is used to switch the white light from a light source 701 to the first light path directly into the overhead projection optics 7030–7035 or to a second light path directly into the electronic display optics 7043–7044, respectively. In this embodiment, the electronic display optics 7040–7044 are located in the main chassis 700, while part of the overhead projector optics 7030–7032 are located in the main chassis 700 and the remaining optics 7033–7035 are located in the remote projection head 705. The remote head 705 is attached to the main chassis 700 by means of an extractable (fold down) arm 706.

In operation, when the fiber bundle 702 is in position 703, light from the light source 701 is directed through a first projection lens 7030, through a Fresnel lens 7031 and clear glass media surface 7032, up to the remote head 705 where it passes through a condensing lens 7033, off a second turning mirror 7034, and through a second projection lens 7035, on to a display screen (not shown).

On the other hand, when the fiber bundle is in position 704, it directs light from the light source 701 into the electronic display optics, where it passes through a rotating color filter wheel 7040, through a condensing lens 7041, into a TIR prism 7042 where it is reflected on to the reflective surface of a SLM 7043, back through the TIR prism 7042, and through a projection lens 7044 on to the same display screen (not shown). A camera 707 is added for capturing a drawn image from the transparency and then adding it electronically to the electronic display image in order to project a superimposed image and store it for future use. Again, optionally, the captured drawn image can be displayed from the camera.

As in the embodiments discussed above, the electronic display can also be implemented using other standard display optics configuration, which may not include a TIR prism and/or an integrating rod.

In this embodiment, the combined projector can be used to solely display overhead projector data (+71), only electronic display data (☐70), or stored superimposed images (⊞72) through the electronic display.

While the present invention has been described in the context of three embodiments, it will be apparent to those skilled in the art that the present invention may be modified in numerous ways and may assume embodiments other than that specifically set out and described above. Accordingly, it is intended by the appended claims to cover all modifications of the invention that fall within the true spirit and scope of the invention.

What is claimed is:

1. A combination overhead projector and electronic display device, comprising:

a white light source coupling light to the optics of said electronic display;

light from said electronic display optics reflected off a first turning mirror in the optics path of said overhead projector, through a backlighted Fresnel lens located just below a transparency media surface in said overhead projector;

light from said Fresnel lens directed to a condenser lens on to the surface of a second turning mirror located in the remote head of said overhead projector; and light reflected from said second turning mirror directed through a projection lens on to a display screen.

2. The projector of claim 1, further comprising a camera located near said remote head for:

capturing a drawn image from said transparency; storing said drawn image;

capturing a superimposed image from the simultaneous projection of said transparency in said overhead projector and electronic content from said electronic display; and storing said superimposed image.

3. The projector of claim 1, wherein said electronic display optics further comprises:

a rotating color filter wheel receiving white light from said light source, said color wheel converting said light to a sequential red, green, blue, and optional white light beam, said sequential light being directed into a condensing lens;

light from said condensing lens coupled on to the reflective surface of a spatial light modulator, said light being modulated and reflected through a projection lens, on to said first turning mirror of said overhead projector.

4. The projector of claim 1, wherein said electronic display optics further comprises:

a rotating color filter wheel receiving white light from said light source, said color wheel converting said light to a sequential red, green, blue, and optional white light beam, said sequential light being directed into a light integrator rod;

light from said integrator rod coupled through a condensing lens into a total internal reflective prism;

said sequential color light reflected out of said total internal reflective prism coupled on to the reflective surface of a spatial light modulator, said light being modulated and reflected back through said total internal reflective prism, through a projection lens, on to said first turning mirror of said overhead projector.

5. The projector of claim 1, wherein said overhead projector's media is a transparency used to modulate the light.

6. The projector of claim 5, being used solely as an overhead projector, wherein a spatial light modulator in said electronic display optics is made fully reflective, reflecting all available light into said overhead projector optics, said light passing through a transparency placed on said media surface, through said remote projector head optics, on to said display screen;

said light being modulated by means of said transparency.

7. The projector of claim 6, being used solely for projection of black/white transparencies, wherein a rotating color filter wheel is removed from said light path.

8. The projector of claim 1, wherein said electronic display accepts VGA, DIVI, S-video, HDTV, and NTSC electronic content data, said data being used to modulate the light reflected from the surface of a spatial light modulator.

9. The projector of claim 4, being used solely as an electronic display, wherein in the absence of an overhead projection transparency, said modulated light from said electronic display is passed unaffected through said overhead projection optics to produce an image on the surface of a display screen.

10. The projector of claim 1 being used to simultaneously combine a projected electronic display image with an overhead projected image, wherein:

light from said electronic display is modulated based on said electronic content, passed into said overhead projector's optics path, where it is further modulated by said light passing through said transparency placed on the overhead projector media surface;

said light being projected on to a display screen.

11. A combination overhead projector and electronic display, comprising:

a white light source providing light to said projector, said light capable of being switched between a first and second light path by a switchable mirror;

said switchable mirror being placed in a first position as a turning mirror to reflect light along said first light path;

a first projection lens in said first light path coupling said light through a Fresnel lens located just below said overhead projection transparency surface, through a condensing lens located in said overhead projector's remote head, on to the surface of a second smaller turning mirror, through a second projection lens in said projection head, on to a display screen to produce a first image on said display screen; and said switchable mirror being placed in a second position to allow said light to be directed along said second light path into said electronic display optics, on to the surface of a spatial light modulator where it is modulated and passed through a second projection lens, on to said display screen to produce a second image on said display screen.

12. The projector of claim 11, further comprising a camera mounted near said remote projection head for: capturing a drawn transparency image;

projecting said captured image on to a display screen;

storing said drawn image from said overhead projector; and storing a superimposed image generated by adding said overhead image and said electronic display image.

13. The projector of claim 12, wherein said electronic display optics further comprises:
   a first condensing lens receiving light from said light source, said condensing lens focusing said light to a small spot at the surface of a color filter wheel;
   sequential red, green, blue, and optional white light from said color filter wheel passing through an integrating rod, through a second condensing lens, on to the surface of a reflective spatial light modulator;
   said sequential light being modulated by said spatial light modulator;
   light from said spatial light modulator reflected through said second projection lens, on to a display screen.

14. The projector of claim 11, wherein said electronic display optics further comprises:
   a first condensing lens receiving light from said light source, said condensing lens focusing said light to a small spot at the surface of a color filter wheel;
   sequential red, green, blue, and optional white light from said color filter wheel passing through an integrating rod, through a second condensing lens, said light being sized and directed into a total internal reflective prism;
   said sequential color light reflected out of said total internal reflective prism, directed on to the surface of a spatial light modulator;
   said sequential light being modulated by said spatial light modulator, reflected back through said total internal reflective prism, through said second projection lens, on to a display screen.

15. The projector of claim 11, wherein said overhead projector's media is a transparency placed on a media surface for modulating the light passing through it.

16. The projector of claim 15, wherein a switchable mirror directs light from said white light source directly into said overhead projector optics.

17. The projector of claim 16, wherein said projector is used to produce only said first image from said transparency placed on said overhead projector's media surface.

18. The projector of claim 11, wherein said electronic display accepts VGA, DIVI, S-video, and NTSC electronic content data, said data being used to modulate the light being reflected from the surface of said spatial light modulator.

19. The projector of claim 18, wherein said switchable mirror directs light from said light source directly into said electronic display optics.

20. The projector of claim 19, wherein said projector produces only said second image from said data content input to said electronic display.

21. The projector of claim 18, wherein a flexible fiber optic cable couples light from said switchable mirror into said electronic display optics.

22. The projector of claim 21, wherein said projector produces only said second image from said data content input to said electronic display.

23. The projector of claim 11, wherein said projector superimposes said first image from said overhead projector and said second image from said electronic display on the surface of said display screen.

24. The projector of claim 23 wherein, said superimposed image is formed by:
   capturing said first transparent image from said overhead projector;
   combining said captured first image with electronic content data presented to said electronic display; and
   displaying the superimposed image through said electronic display.

25. The projector of claim 24, wherein said captured first image is stored for future use; and
   said superimposed image is stored for future use.

26. A combination overhead projector and electronic display, comprising:
   a white light source providing light to said projector, said light capable of being switched between a first and second light path by a switchable fiber optics bundle;
   said switchable fiber bundle being placed in a first position to reflect light along said first light path;
   a first projection lens in said first light path coupling said light through a Fresnel lens located just below the overhead projection transparency surface, through a condensing lens located in said overhead projector's remote head on to the surface of a second smaller turning mirror, through a second projection lens in said projection head, on to a display screen to produce a first image on said display screen; and
   said switchable fiber bundle being placed in a second position to allow said light to be directed along said second light path into said electronic display optics on to the surface of a spatial light modulator where it is modulated and passed through a second projection lens and on to said display screen.

27. The projector of claim 26, further comprising a camera mounted near said remote projection head for:
   capturing a drawn transparency image;
   projecting said captured image on to a display screen;
   storing said drawn image from said overhead projector; and
   storing a superimposed image generated by adding said overhead image and said electronic display image.

28. The projector of claim 26, wherein said electronic display optics further comprises:
   light from said fiber bundle being directed on to the surface of a color filter wheel;
   sequential red, green, blue, and optional white light from said color filter wheel passing through a condensing lens, on to the surface of a reflective spatial light modulator;
   said sequential light being modulated by said spatial light modulator;
   light from said spatial light modulator reflected through a projection lens, on to a display screen.

29. The projector of claim 26, wherein said electronic display optics further comprises:
   light from said fiber bundle being focused directly on to the surface of a rotating color filter wheel;
   sequential red, green, blue, and optional white light from said color filter wheel passing through a condensing lens, said light being sized and directed into a total internal reflective prism;
   said sequential color light reflected out of said total internal reflective prism and directed on to the surface of a spatial light modulator;
   said sequential light being modulated by said spatial light modulator, reflected back through said total internal reflective prism, through said second projection lens, and on to a display screen.

30. The projector of claim 26, wherein said overhead projector's media is a transparency placed on a media surface for modulating the light passing through it.

31. The projector of claim 30, wherein said switchable fiber bundle directs light from said white light source directly into said overhead projector optics.

32. The projector of claim 31, wherein said projector is used to produce only said first image from said transparency placed on said overhead projector's media surface.

33. The projector of claim 26, wherein said electronic display accepts VGA, DIVI, S-video, and NTSC electronic content data, said data being used to modulate the light being reflected from the surface of said spatial light modulator.

34. The projector of claim 33, wherein said switchable fiber bundle directs light from said light source directly into said electronic display optics.

35. The projector of claim 34, wherein said projector produces only said second image from said data content input to said electronic display.

36. The projector of claim 26, wherein said projector superimposes said first image from said overhead projector and said second image from said electronic display on the surface of said display screen.

37. The projector of claim 36 wherein, said superimposed image is formed by:

capturing said first transparent image with said camera from said overhead projector;

combining said capture first image with said electronic content data image presented to said electronic display; and displaying the superimposed image through said electronic display.

38. The projector of claim 37, wherein said captured first image is stored for future use; and said superimposed image is stored for future use.

* * * * *